United States Patent
Kimura

(10) Patent No.: US 11,637,509 B2
(45) Date of Patent: Apr. 25, 2023

(54) VIBRATORY ACTUATOR AND METHOD FOR MANUFACTURING THE SAME

(71) Applicant: CANON KABUSHIKI KAISHA, Tokyo (JP)

(72) Inventor: Atsushi Kimura, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/498,423

(22) Filed: Oct. 11, 2021

(65) Prior Publication Data
US 2022/0140754 A1   May 5, 2022

(30) Foreign Application Priority Data
Nov. 2, 2020 (JP) .............................. JP2020-183649

(51) Int. Cl.
  *H02N 2/10*  (2006.01)
  *H02N 2/00*  (2006.01)
(52) U.S. Cl.
  CPC ............... *H02N 2/103* (2013.01); *H02N 2/22* (2013.01)
(58) Field of Classification Search
  CPC ........ H02N 2/103; H02N 2/22; H02N 2/0065; H02N 2/0015
  See application file for complete search history.

(56) References Cited

U.S. PATENT DOCUMENTS

| 2013/0278112 | A1* | 10/2013 | Yokoyama | H01L 41/337 29/25.35 |
| 2016/0111981 | A1* | 4/2016 | Yokoyama | H02N 2/026 29/25.35 |
| 2017/0082828 | A1* | 3/2017 | Sumioka | G02B 7/04 |
| 2017/0371125 | A1* | 12/2017 | Ninomiya | H02N 2/0065 |

FOREIGN PATENT DOCUMENTS

| JP | H05137355 A | 6/1993 |
| JP | 2005065477 A | 3/2005 |
| JP | 2016226161 A | 12/2016 |
| JP | 2017225333 A | 12/2017 |

* cited by examiner

*Primary Examiner* — Emily P Pham
(74) *Attorney, Agent, or Firm* — Canon U.S.A., Inc. I.P. Division

(57) ABSTRACT

A vibratory actuator includes a vibration member, a contact member, and a pressure member. The vibration member includes an elastic member, having protrusions. The contact member is in contact with the elastic member and moves in a direction relative to the vibration member. The pressure member pressurizes the vibration member and the contact member. Each of the protrusions includes a first contact surface in contact with the contact member. The contact member has a second contact surface made of metal sintered material and in contact with the vibration member. A ratio of a maximum amount of depression on the second contact surface in the direction of pressurization by the pressure member to a width of the first contact surface in a direction perpendicular to the direction of movement of the contact member relative to the vibration member and the direction of pressurization by the pressure member is 0.05% or less.

16 Claims, 16 Drawing Sheets

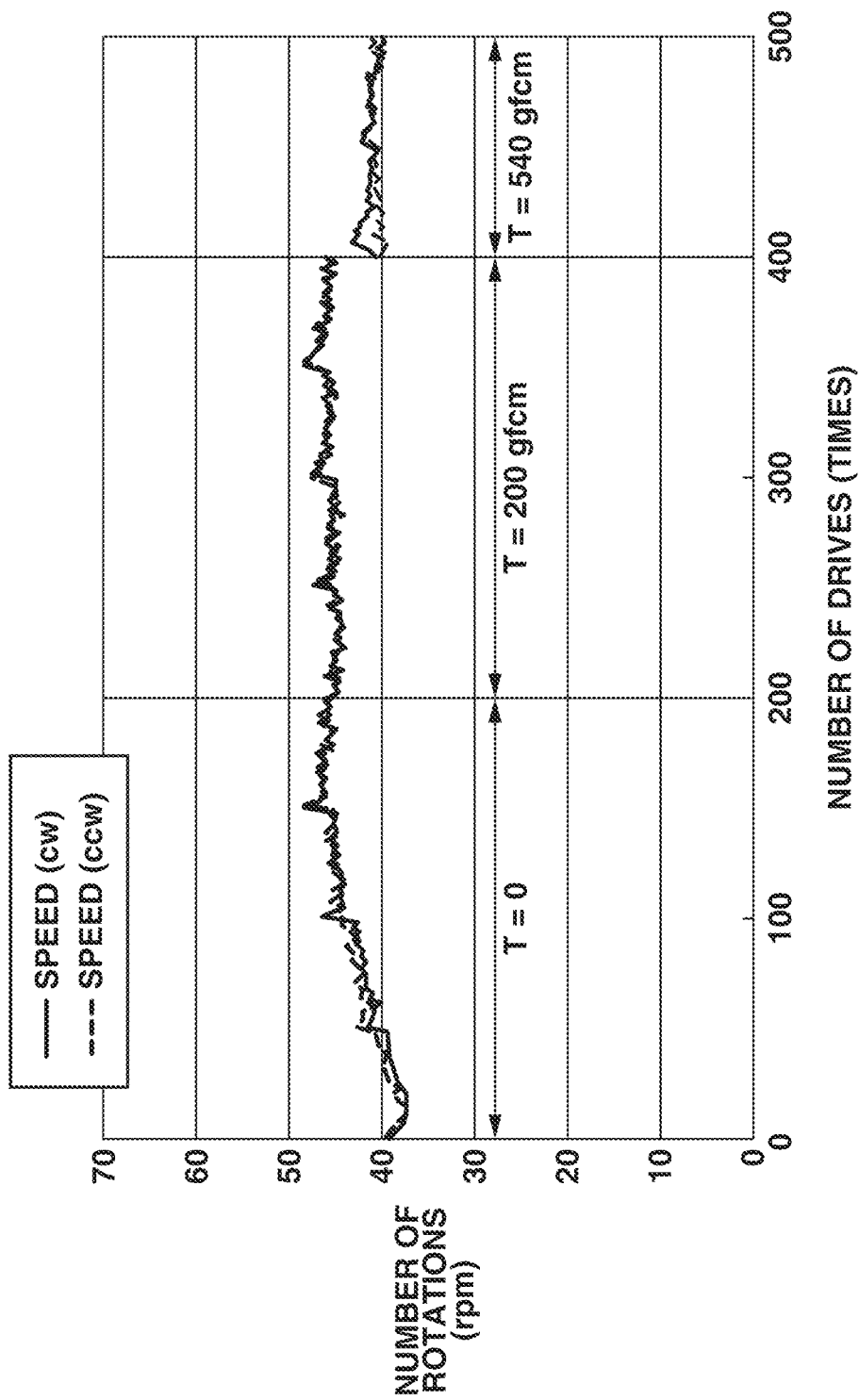

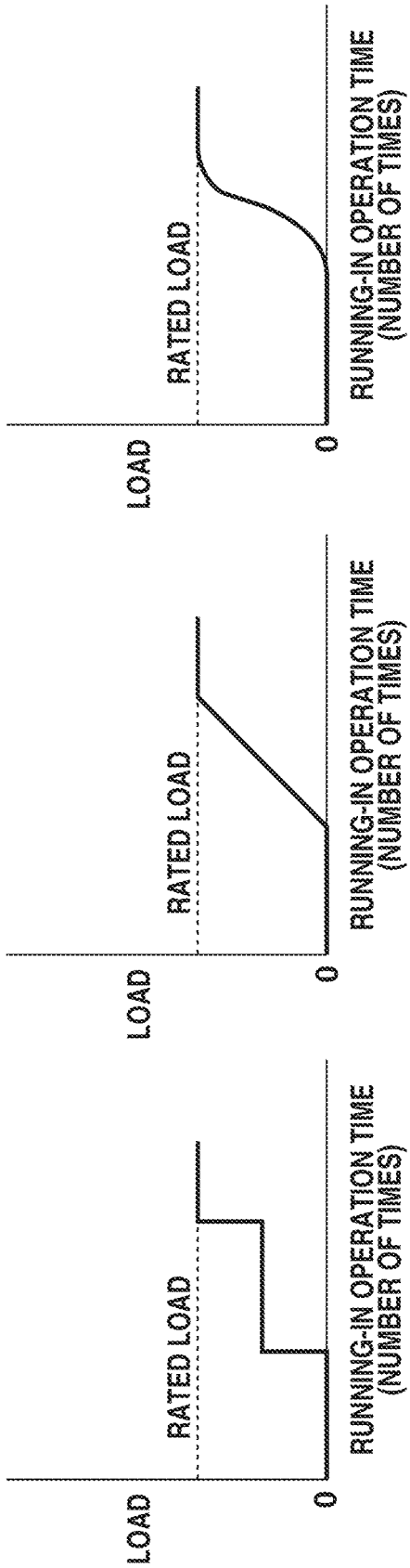

Prior Art FIG.12A
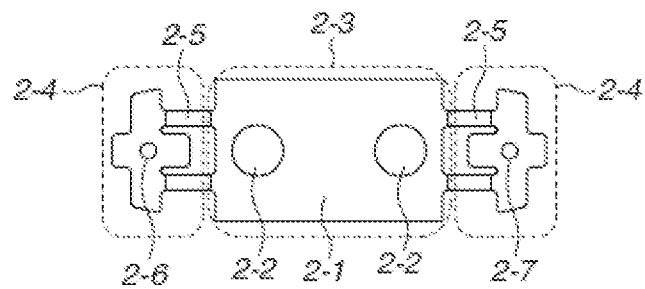
Prior Art FIG.12B
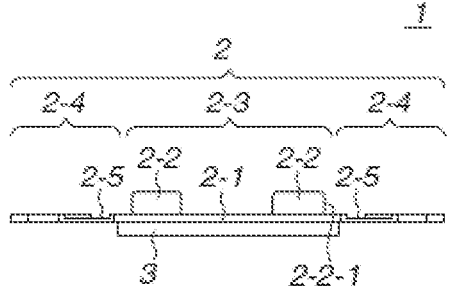
Prior Art FIG.12C
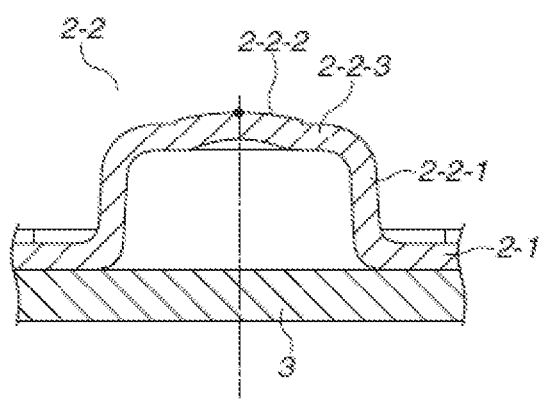

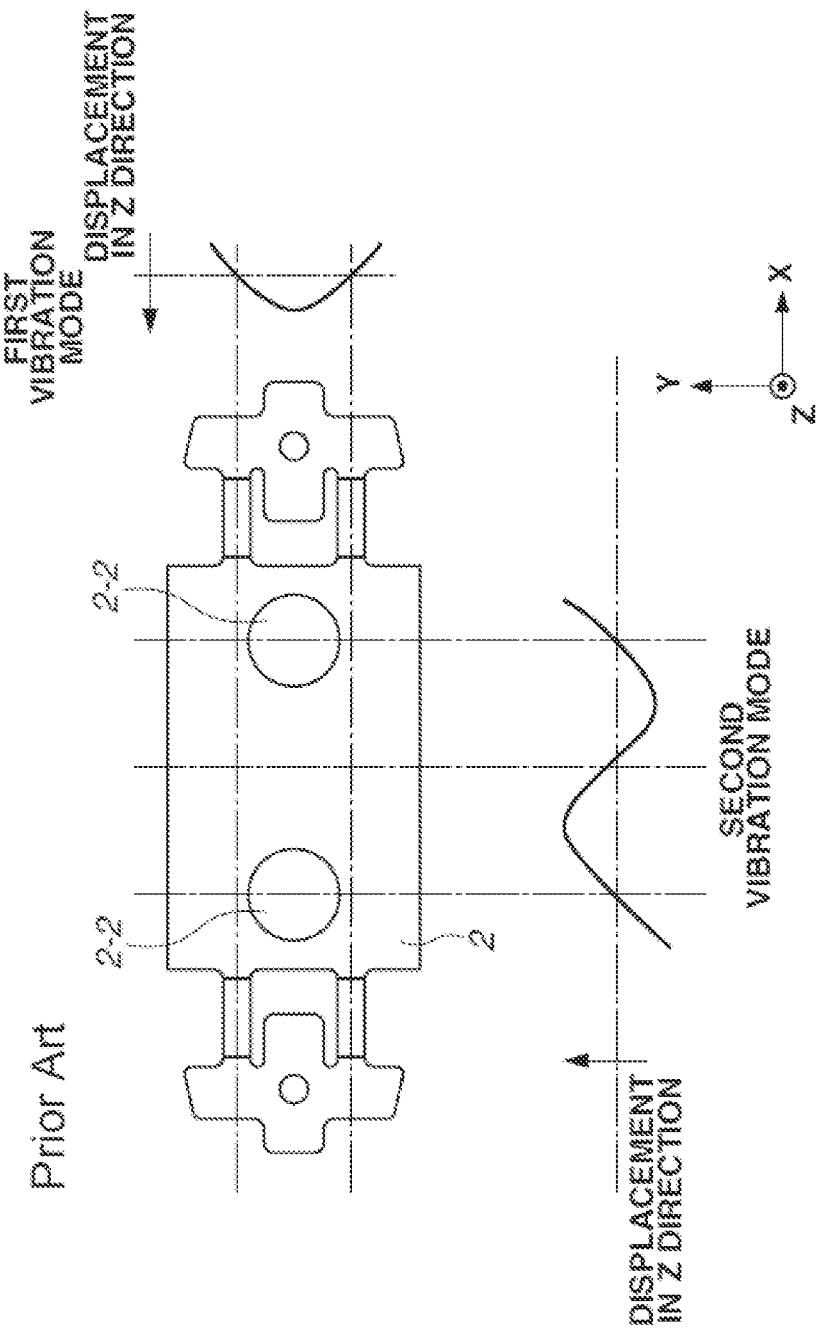

FIRST VIBRATION MODE

SECOND VIBRATION MODE

VIBRATORY ACTUATOR AND METHOD FOR MANUFACTURING THE SAME

BACKGROUND

Field

The present disclosure relates to a vibratory actuator and a method for manufacturing the vibratory actuator.

Description of the Related Art

There has conventionally been proposed a vibratory actuator in which a contact member in contact with a vibration member is driven by a vibration excited (generated) by the vibration member (the contact member in contact with the vibration member is moved relative to the vibration member). In this case, the vibration member includes an elastic member, an electro-mechanical energy transducer fixed to the elastic member, and protrusions formed on the elastic member.

For example, as discussed in Japanese Patent Application Laid-Open No. 2016-226161, there has been proposed a type in which a rectangular piezoelectric element and an elastic member are bonded, protrusions each having a spherically shaped tip are provided on the elastic member, the spherically shaped portion comes into contact with a contact member, and a vibration member and the contact member linearly move relative to each other (relative movement). A prior art will be described below with reference to FIGS. 12A to 12C and 13.

FIGS. 12A, 12B, and 12C are a plan view, a side view, and an enlarged cross-sectional view, respectively, illustrating the vibration member. Referring to FIGS. 12A to 12C, a vibration member 1 includes a piezoelectric element 3 (electro-mechanical energy transducer) formed like a rectangular (square) plate, and an elastic member 2 fixed (bonded) to (a plane of) the piezoelectric element 3. In other words, the vibration member 1 includes an elastic member, and an electro-mechanical energy transducer fixed to the elastic member. The elastic member 2 includes a main portion 2-3, and support members 2-4 that support the main portion 2-3.

The main portion 2-3 includes a base 2-1 formed like a rectangular plate that vibrates together with the piezoelectric element 3, and two protrusions 2-2 formed as convex portions on a plane of the base 2-1. As illustrated in the enlarged cross-sectional view illustrated in FIG. 12C, each protrusion 2-2 includes a continuous side wall 2-2-1 protruded from the base 2-1 (elastic member 2) to form a hollow structure, and a spherically shaped contact portion 2-2-2 (first contact portion) in contact with the contact member, at the top of the protrusion 2-2. The first contact portion 2-2-2 and the side wall 2-2-1 are connected by a connecting portion 2-2-3 having flexibility in the direction of pressurization by a pressure member (Z direction). Thus, the contact portion 2-2-2 (first contact portion) and the connecting portion 2-2-3 have predetermined flexibility. While the protrusions 2-2 are illustrated as having a cylindrical shape in FIGS. 12A, 12B, and 12C, the protrusions 2-2 may also have a prismatic shape as illustrated in FIG. 14A.

This flexibility is provided so that the contact member sufficiently tracks the supersonic vibration of the vibration member to transmit a driving force. Pressure members used include rectangular leaf springs 91 sandwiched by a support member 71 and a pressure adjustment ring 90 (FIG. 15), and a ring-shaped leaf spring 92 sandwiched by a support member 72 and the pressure adjustment ring 90 (FIG. 16). However, the present disclosure is not limited thereto.

The support members 2-4 also have flexibility and structurally integrally formed with the main portion 2-3. Each support member 2-4 has a thin portion 2-5 having a partially thin portion not to transmit the vibration of the main portion 2-3 to outside the main portion 2-3 as much as possible. The support member 2-4 also includes a round hole 2-6 and an oblong hole 2-7 used at the time of positioning in bonding the piezoelectric element 3 and assembling the vibration member. Therefore, the purpose of this flexibility is different from that of the above-described flexibility. The rigidity of the support member 2-4 is sufficiently lower than that of the connecting portion 2-2-3 and the main portion 2-3.

As illustrated in FIGS. 13 and 14A to 14D, when two electrode regions of the piezoelectric element 3 of the vibration member 1 are applied with 2-phase AC voltages (VA and VB), a vibration (elliptic motion) is generated at the tips of the protrusions 2-2, and the contact member 8 is driven. This elliptic motion causes the contact member to be moved relative to the vibration member. The elliptic motion occurs as a result of the vibration of the first vibration mode and the vibration of the second vibration mode being generated with a time phase difference. The first vibration mode is a vibration mode that produces a displacement in the Z direction at the tips of the protrusions 2-2 (see FIG. 14C). The second vibration mode is a vibration mode that produces a displacement in the direction (X direction) of the movement of the contact member relative to the vibration member at the tips of the protrusions 2-2 (see FIG. 14D). Normally, such a vibratory actuator uses a vibration of micron order. Accordingly, to stably bring the contact surface of the vibration member (first contact surface) and the contact surface of the contact member (second contact surface) into contact with each other, the contact surface of the vibration member (first contact surface) and the contact surface of the contact member (second contact surface) have been subjected to polishing to improve the flatness (restrict the surface roughness). However, even in this case, the edge of the contact portion of the vibration member (first contact portion) is highly likely to come in contact with the contact member in the early stage of drive due to assembly error between the vibration member and the contact member. Thus, it is difficult to achieve secure planar contact between the contact surface of the vibration member (first contact surface) and the contact surface of the contact member (second contact surface). Further, as shown in FIG. 12C, even in a case where the contact portion of the vibration member is a spherical surface, the contact between the vibration member and the contact member is in the form of point contact in the early stage of drive. Therefore, it is common to perform a running-in operation to stably drive the vibratory actuator before product shipment from the factory.

As a prior example of the running-in operation, Japanese Patent Application Laid-Open No. 5-137355 discusses a progressive-wave ring-shaped actuator subjected to a running-in operation with a rated load for 24 hours. Japanese Patent Application Laid-Open No. 2005-65477 discloses a method for performing a running-in operation in a state where a vibratory actuator that linearly drives a stage guided by a cross roller guide is incorporated into an apparatus. Japanese Patent Application Laid-Open No. 2005-65477 also discloses a method for measuring the performance at intervals for a predetermined number of times. The method continues the running-in operation if any change occurs or ends the running-in operation if no change occurs.

In recent years, high thrust has been demanded as a performance of vibratory actuators. Increasing the thrust of a vibratory actuator increases the rated load. Therefore, if the vibratory actuator is left under high temperature and high humidity, the vibration member and the contact member become slippery, resulting in a high likelihood of a significant thrust decrease. Therefore, to prevent the vibration member and the contact member from becoming slippery even with high thrust, the use of a vibration member having a contact surface made of a metal sintered material has been studied (see Japanese Patent Application Laid-Open No. 2017-225333).

However, if a rotor (contact member) having a contact surface (second contact surface) made of a metal sintered material is used in a conventional running-in operation performed with the rated load, it is difficult to conform the contact surface (second contact surface) made of a metal sintered material to the facing surface without damaging the contact surface (second contact surface). An oxide film is formed on the contact surfaces of the vibration member and the contact member before the running-in operation, and the vibration member and the contact member are in contact with each other at one point for each protrusion of the vibration member. Therefore, the vibratory actuator cannot be stably driven because of a very small frictional force.

Even if the vibratory actuator can be driven with the rated load, a very large surface pressure is applied to the contact surface of the contact member (second contact surface). As a result, it is highly likely to cause damage to the contact surface of the contact member (second contact surface).

SUMMARY

The present disclosure is directed to providing a vibratory actuator that prevents the contact surface of the contact member from being damaged by the vibration member, and a method for manufacturing the vibratory actuator.

According to an aspect of the present disclosure, a vibratory actuator includes a vibration member including an elastic member and an electro-mechanical energy transducer fixed to the elastic member, wherein the elastic member has protrusions formed on the elastic member, a contact member in contact with the elastic member and configured to be moved in a direction relative to the vibration member by a vibration that is generated in the vibration member by an alternating-current (AC) voltage applied to the electro-mechanical energy transducer, and a pressure member configured to pressurize the vibration member and the contact member, wherein each of the protrusions includes a first contact surface in contact with the contact member, wherein the contact member has a second contact surface made of metal sintered material and in contact with the vibration member, and wherein a ratio of a maximum amount of depression on the second contact surface in the direction of pressurization by the pressure member to a width of the first contact surface in a direction perpendicular to the direction of movement of the contact member relative to the vibration member and the direction of pressurization by the pressure member is 0.05% or less.

Further features of the present disclosure will become apparent from the following description of exemplary embodiments with reference to the attached drawings.

BRIEF DESCRIPTION OF THE DRAWINGS

FIG. 7 illustrates a transition of the number of rotations of the vibratory actuator according to an exemplary embodiment of the present disclosure during the running-in operation.

FIGS. 10A, 10B, and 10C illustrate images of changes of an external load of the vibratory actuator according to an exemplary embodiment of the present disclosure during the running-in operation.

FIGS. 12A, 12B, and 12C are a plan view, a side view, and an enlarged cross-sectional view, respectively, illustrating the vibration member.

FIG. 13 illustrates vibration modes of the vibration member.

DESCRIPTION OF THE EMBODIMENTS

Exemplary embodiments of the present disclosure will be described in detail below with reference to the accompanying drawings. According to the present exemplary embodiment, a vibratory actuator includes a vibration member that excites a drive vibration (generates a vibration), and a contact member that is brought into pressure contact with the vibration member by a pressure member (a contact member that comes into contact with the vibration member). The vibratory actuator refers to a device configured to cause the vibration member and the contact member to be moved relative to each other by a drive vibration (cause the contact member to move relative to the vibration member). More specifically, the vibratory actuator refers to a device configured to take out a drive output of the vibration member by a relative movement of the vibration member and the contact member. Therefore, the present exemplary embodiment includes two different configurations where the vibration member is driven and where the contact member is driven.

Figure 1A:
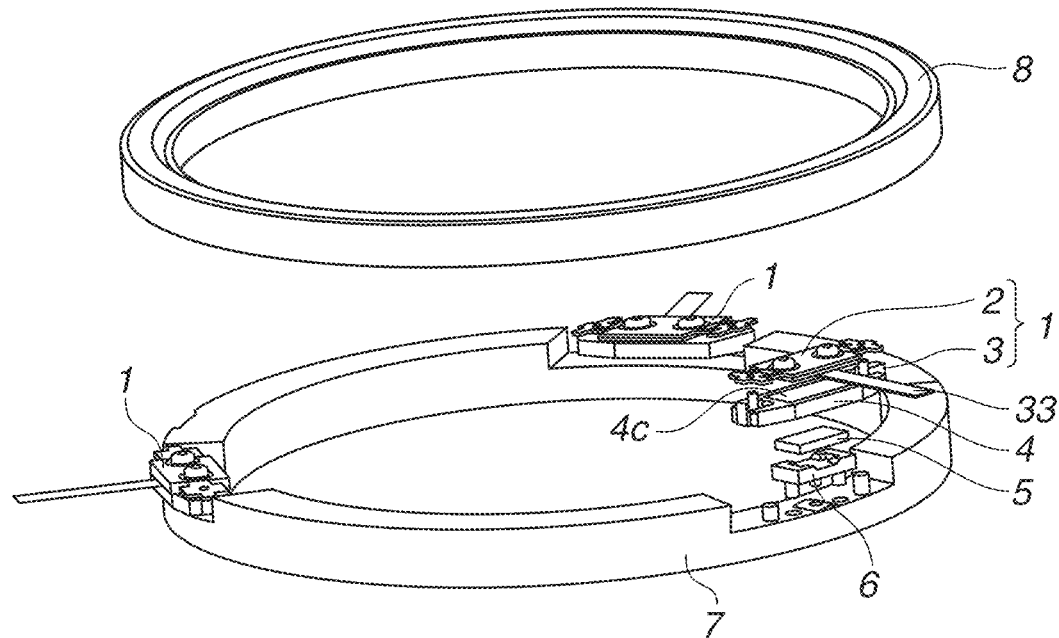
FIG. 1A is an overall exploded perspective view illustrating some parts of a vibratory actuator according to an exemplary embodiment of the present disclosure.
Figure 1B:
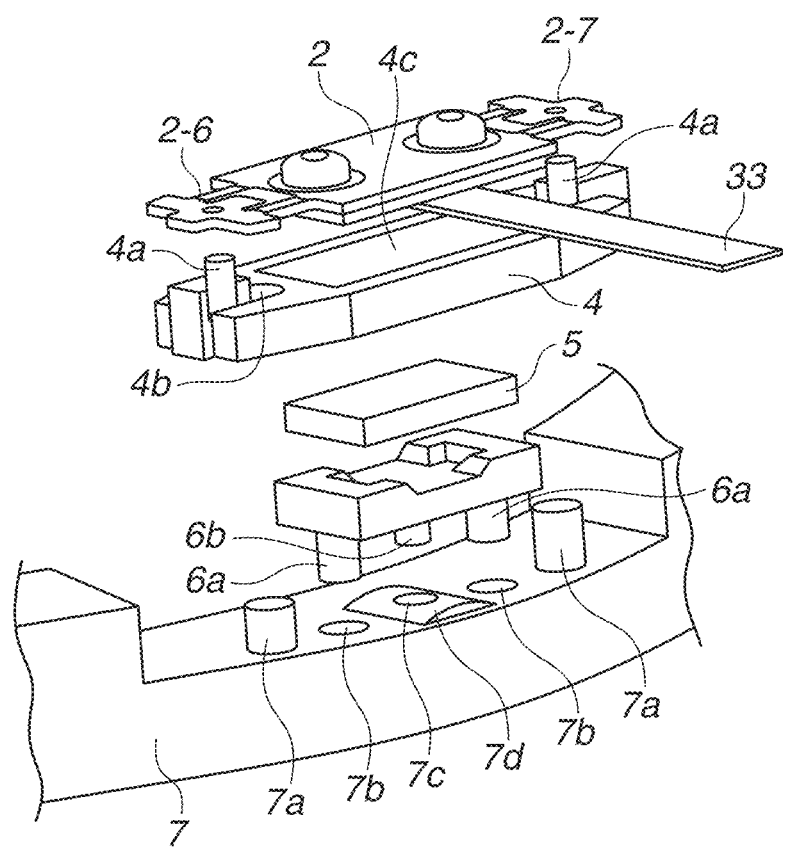
FIG. 1B is an enlarged exploded perspective view illustrating the periphery of the vibration member.

A first exemplary embodiment will be described below. FIGS. 1A and 1B illustrate the first exemplary embodiment of the present disclosure. FIG. 1A is an exploded perspective view illustrating some parts of a rotary actuator in which three (a plurality of) vibration members of the type illustrated in FIGS. 12A to 12C are disposed on the circumference. FIG. 1B is an enlarged exploded perspective view illustrating the periphery of a vibration member 1. As illustrated in FIG. 1, three (a plurality of) vibration members 1 are disposed on a ring-shaped base (support member) 7. A rotor (contact member) 8 in contact with the vibration member 1 is rotatably driven when power is supplied via a flexible substrate 33.

Figure 15:
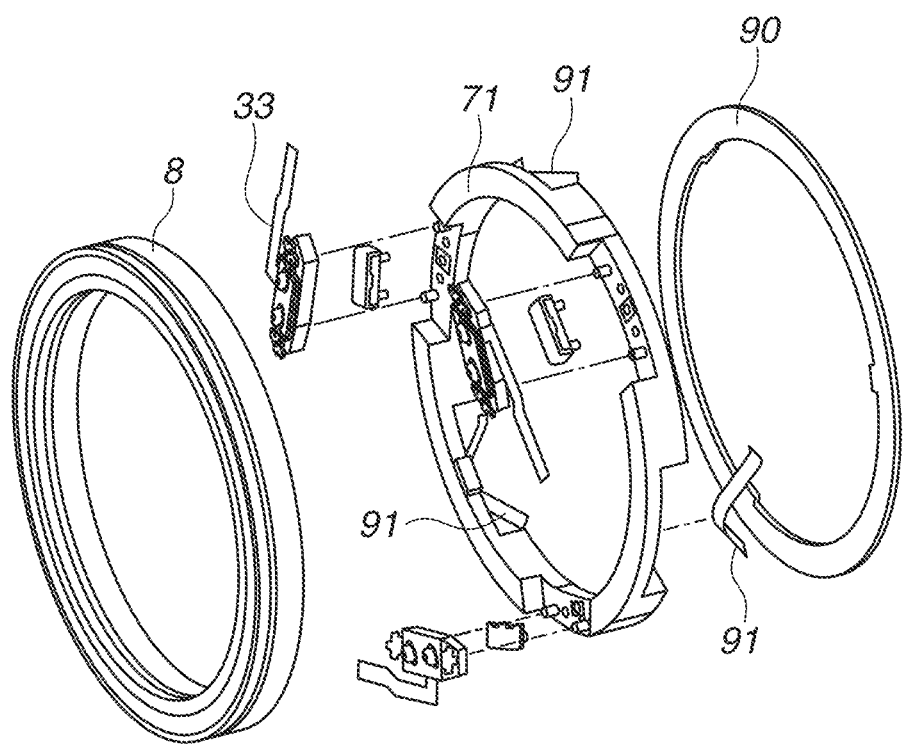
FIG. 15 illustrates a pressure member.
Figure 16:
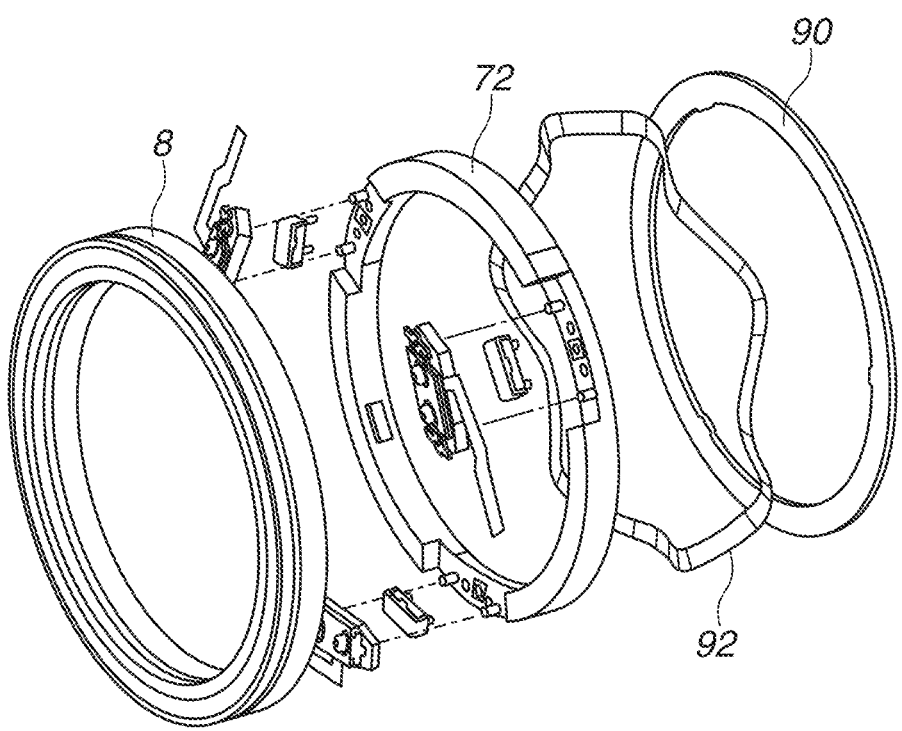
FIG. 16 illustrates the pressure member.

The vibration member 1 is held on a small base (holding member 4) by fitting pins 4a of the holding member 4 into a round hole 2-6 and an oblong hole 2-7 of the support member and bonding the pins 4a and the holes 2-6 and 2-7. When pins 7a of the support member 7 fit into holes 4b, the holding member 4 is positioned to be freely movable in the pressure direction. A rectangular through-hole 4c is formed on the holding member 4, and a pressure member 6 (that presses the vibration member 1) fits into the through-hole 4c. The pressure member 6 in contact with the support member 7 presses the vibration member 1 by pressure members (the rectangular leaf spring 91 in FIG. 15 and the ring-shaped leaf spring 92 in FIG. 16) via a vibration insulation member 5 (such as felt). The pressure member 6 is movable relative to the holding member 4 in the pressure direction. The above-described configuration hardly applies a pressure reaction force to the support member 2-4 and prevents the bonding of the piezoelectric element from peeling.

The pressure member 6 is provided with positioning pins 6a and 6b that fit into holes 7b and 7c on the support member 7 to be positioned. The pressure member 6 comes into contact with a semicylinder-shaped surface (convex portion) 7d of the support member 7 to be rotatable in the pitch direction (direction of the movement relative to the contact member 8).

Figure 3A:
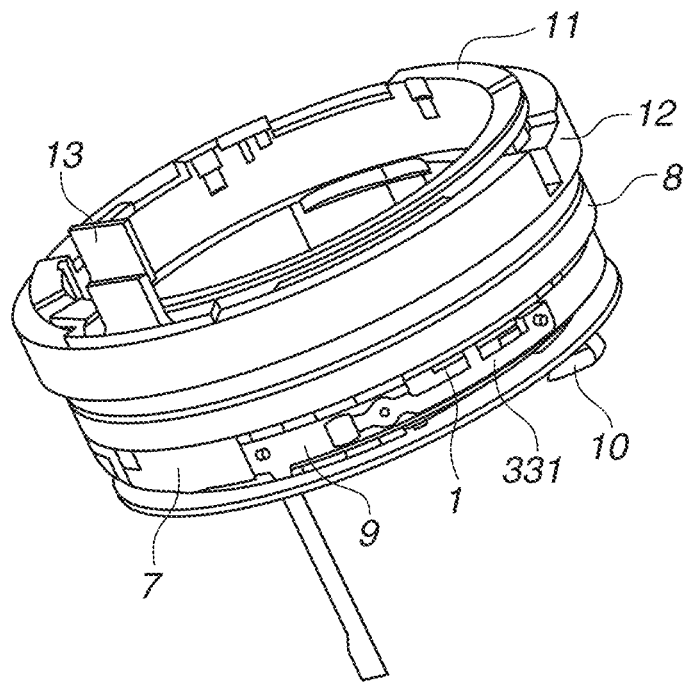
FIG. 3A is a perspective view illustrating the vibratory actuator incorporated in a focus unit of a single-lens reflex camera lens according to an exemplary embodiment of the present disclosure.

FIG. 3A is a perspective view illustrating a state where the rotary actuator illustrated in FIG. 1 is incorporated in the focus unit of a single-lens reflex camera. In the rotary actuator illustrated in FIG. 3A, a flexible substrate 331 is connected to a wraparound flexible substrate 9 which is wound around the support member 7 so that the three vibration members 1 are connected in parallel. The wraparound flexible substrate 9 is connected to a drive circuit (not illustrated) to drive the plurality of vibration members by using one circuit. Detailed descriptions of the focus unit will be omitted. The focus unit includes a fixed cylinder 11, and a rotary cylinder 12 that integrally rotates with a rotor 8 (contact member). The rotary cylinder 12 is provided with an output key 13 (driven member).

Figure 3B:
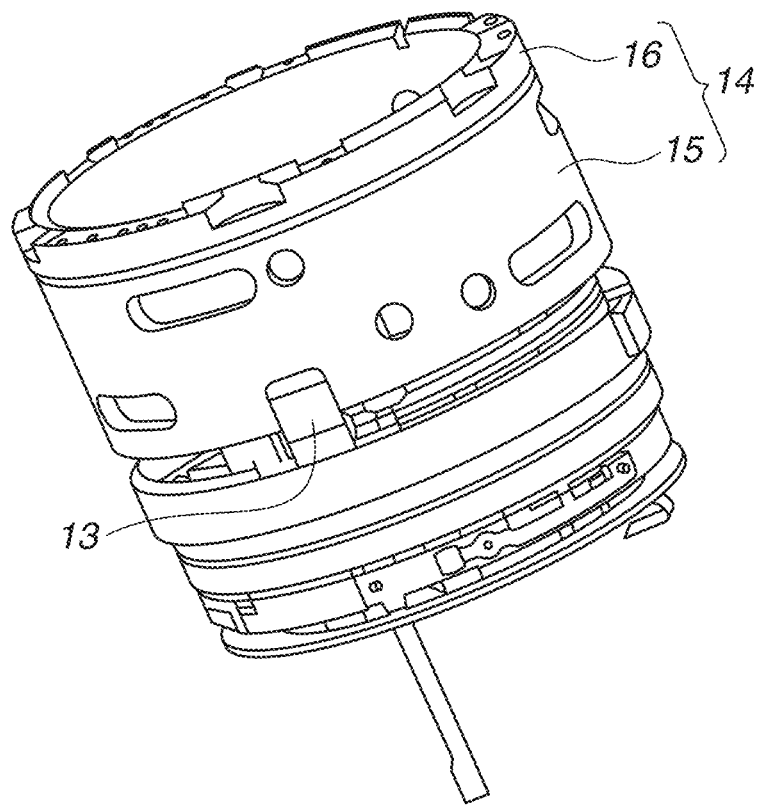
FIG. 3B is a perspective view illustrating a lens barrel unit in which the focus unit is incorporated in a lens barrel.

FIG. 3B is a perspective view illustrating a state where the focus unit in FIG. 3A and a lens barrel 14 are joined to the output key 13. The output key 13 is fit into a cam ring member 15, the cam ring member 15 is rotated, and the holding member that holds the automatic focusing (AF) lens (not illustrated) on the inner diameter side of a lens barrel fixing member 16 is advanced and retracted in the optical axis direction.

Figure 4:
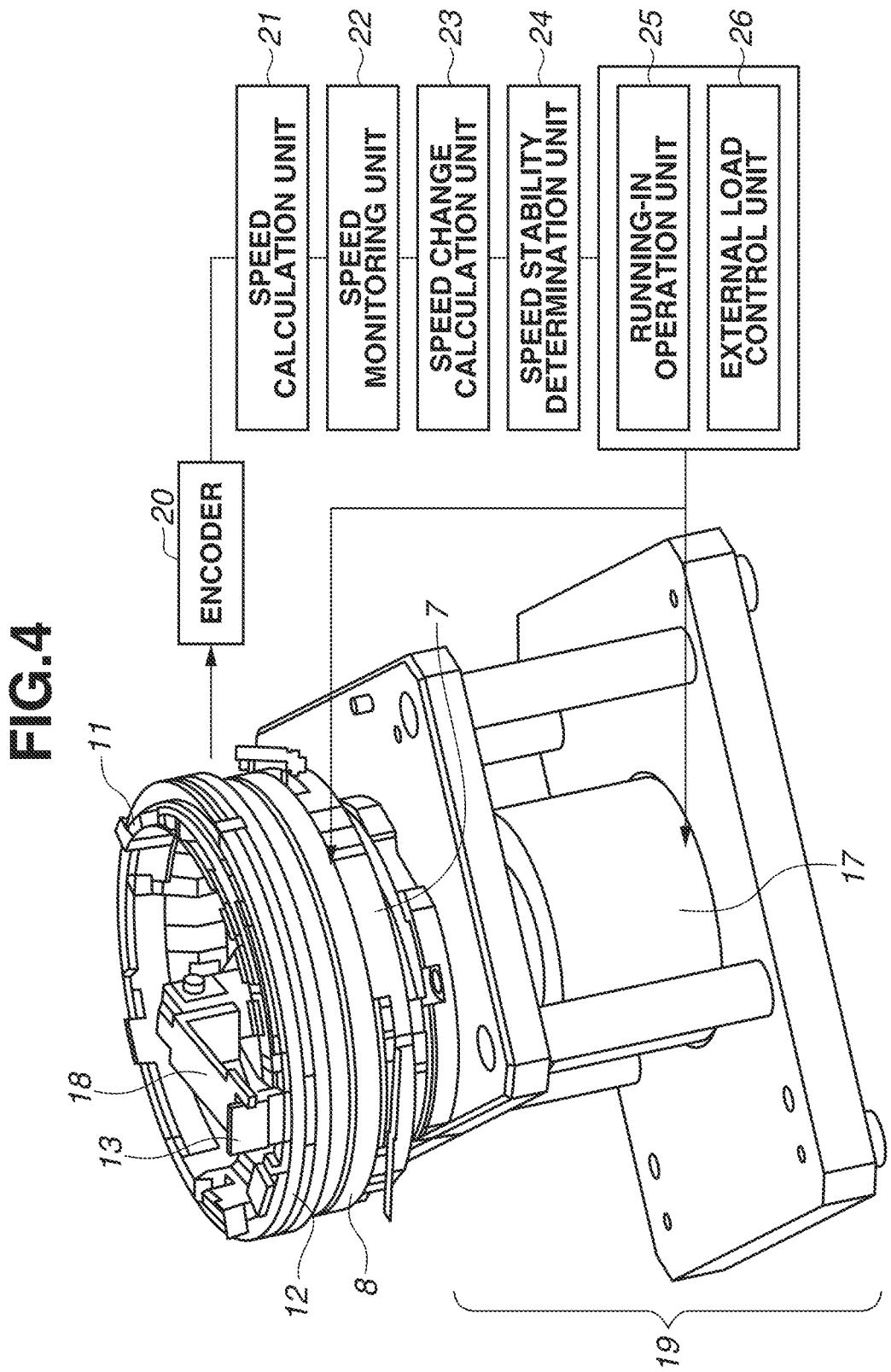
FIG. 4 illustrates an image of the focus unit incorporating the vibratory actuator according to an exemplary embodiment of the present disclosure, mounted in the running-in operation driving apparatus.

FIG. 4 is a schematic view illustrating a driving apparatus that performs the running-in operation of the rotary actuator incorporated in the focus unit illustrated in FIG. 3A. The focus unit is fixed to a running-in operation tool 19, and a torque transmission member 18 (external load generation apparatus) attached to the shaft of an electro-magnetic brake 17 (external load generation apparatus) is joined with the output key 13.

The driving apparatus includes a speed calculation unit 21, a speed monitoring unit 22, a speed change calculation unit 23, a speed stability determination unit 24, a running-in operation unit 25, and an external load control unit 26. The speed calculation unit 21 calculates the speed based on positional information of the rotary cylinder 12 detected by an encoder 20 disposed in the focus unit. The speed monitoring unit 22 monitors the speed calculated by the speed calculation unit 21. The speed change calculation unit 23 calculates the speed variation. The speed stability determination unit 24 determines whether the speed has become stable. The running-in operation unit 25 drives the actuator. The external load control unit 26 controls the load to be applied to the rotary actuator.

Figure 5:
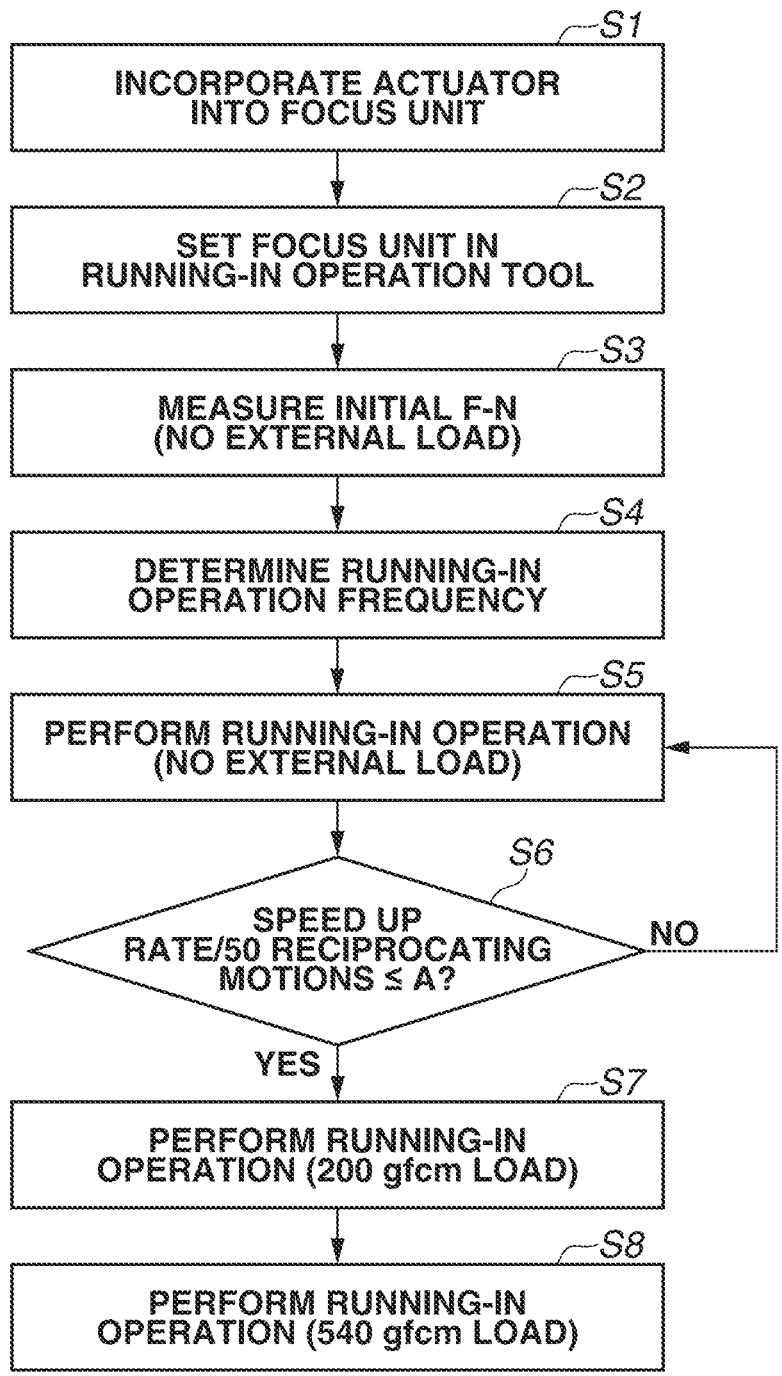
FIG. 5 is a flowchart illustrating the running-in operation of the vibratory actuator according to an exemplary embodiment of the present disclosure.

FIG. 5 is a flowchart illustrating the running-in operation. First of all, the drive frequency of the running-in operation (running-in operation frequency) needs to be determined. In consideration of the variation of the resonance frequency of the vibration member, it is necessary to once confirm the frequency-speed characteristics (F-N characteristics). In step S1, the rotary actuator is incorporated into the focus unit. In step S2, the focus unit with the rotary actuator incorporated therein is set to the running-in operation tool 19. In step S3, the F-N characteristics (initial F-N characteristics) prior to the running-in operation without an external load are measured. "No external load" includes a case where no external load is applied and a case where the external load is so small that it can be virtually ignored.

Figure 6:
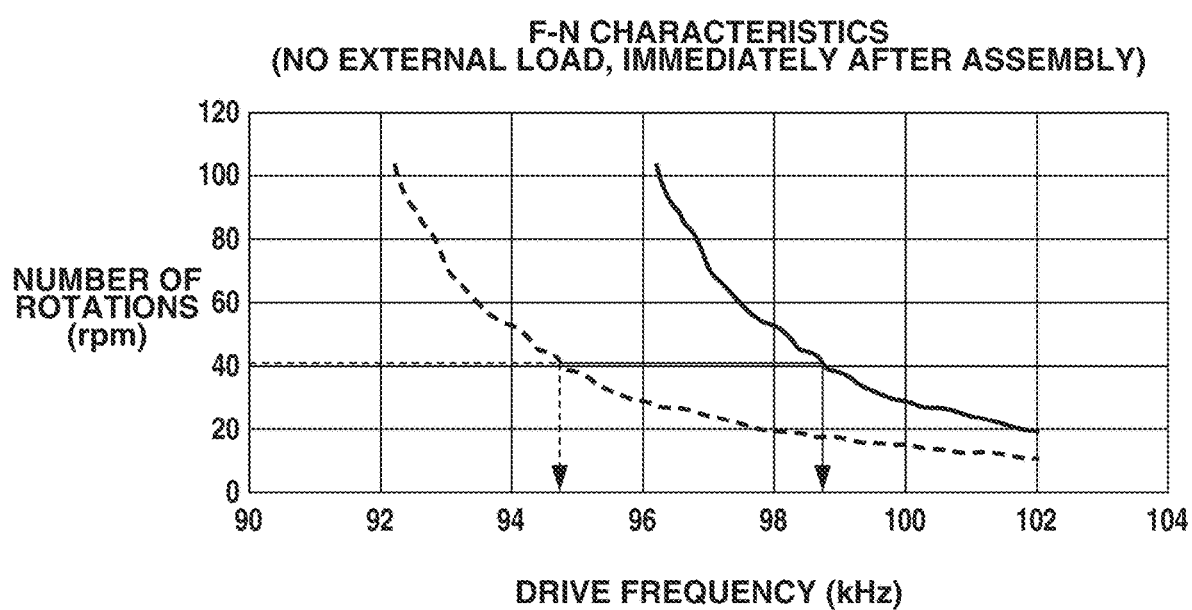
FIG. 6 illustrates frequency-speed characteristics (F-N characteristics) of the vibratory actuator according to an exemplary embodiment of the present disclosure before the running-in operation.

FIG. 6 illustrates the initial F-N characteristics with a high resonance frequency of the vibration member in the running-in operation (in a case where a curve based on the solid line in FIG. 6 is obtained) and the F-N characteristics with a low resonance frequency thereof (in a case where a curve based on the dotted line in FIG. 6 is obtained). In consideration of variation of the resonance frequency for each vibration member at the time of mass-production, a comparatively wide frequency sweep is performed (the drive frequency is changed from 102 to 92 kHz at a constant rate). The drive frequency of the running-in operation (running-in operation frequency) is determined and set to the drive frequency corresponding to the output speed when the vibratory actuator is actually used. For example, if the output speed (the number of rotations) when the vibratory actuator is actually used is 40 rpm, the running-in operation frequency is determined and set to the drive frequency corresponding to 40 rpm.

More specifically, in a case where the initial F-N characteristics in FIG. 6 are obtained and the resonance frequency of the vibration member is low (in a case where a curve based on the dotted line in FIG. 6 is obtained), the running-in operation frequency is determined and set to 94.8 kHz. In a case where the initial F-N characteristics in FIG. 6 are obtained and the resonance frequency of the vibration member is high (in a case where a curve based on the solid line in FIG. 6 is obtained), the running-in operation frequency is determined and set to 98.8 kHz (step S4 in FIG. 5). If the number of rotations is increased more than necessary, the electro-mechanical energy transducer (PZT) may separate or crack. Accordingly, when the frequency sweep is performed, the actuator is stopped when the number of rotations reaches 100 rpm.

FIG. 7 illustrates a transition (F-N characteristic transition) of the number of rotations (rotational speed in rpm) with respect to the number of reciprocating motions (times) when the running-in operation is performed (step S5 in FIG. 5), for example, with the drive frequency f=96.9 kHz determined in the first F-N characteristic measurement. The graph illustrates the values for the forward process (cw) and the return process (ccw). Assuming that the actuator reciprocates once for each drive, the number of reciprocating motions can be the number of drives in other words. Since the actuator is operated in units of 50 reciprocating motions, there are discontinuous portions every 50 motions, but one can see the rise in the number of rotations. However, the increase rate of the number of rotations decreases (the speed up rate decreases) when 100 to 150 reciprocating motions have been made without an external load, and becomes almost zero when 150 to 200 reciprocating motions have been made. The "Speed up rate" refers to the increase rate of the output speed (the number of rotations), i.e., the increase in speed in unit time. The speed up rate may be measured per a predetermined drive time or per a predetermined number of times.

At the timing determined based on the speed up rate (YES in step S6 in FIG. 5, that is, when the speed up rate is equal to or less than a predetermined value A), the external load control unit 26 issues an instruction for applying the external load (increasing the external load from the state of no external load) at the timing determined based on the speed up rate. More specifically, the external load control unit 26 issues the instruction for increasing the external load from the state of no external load at the timing when the speed stability determination unit 24 recognizes that there is substantially no increase in the speed, i.e., the speed up rate is equal to or less than the predetermined value A (YES in step S6 in FIG. 5). At this timing, the contact region of the vibration member has not yet become sufficiently large, i.e., the surface pressure of the contact surface of the vibration member (first contact surface) has not sufficiently decreased, and hence immediately driving the actuator with the rated load may cause damage to the rotor 8. For example, in a case where the rated load is 540 gram force centimeter (gfcm), in step S7 in FIG. 5, the running-in operation unit 25 performs the running-in operation with about a half of the rated load, 200 gfcm. Then, in step S8 in FIG. 5, the running-in operation unit 25 performs the running-in operation with the rated load (540 gfcm).

Figure 2A:
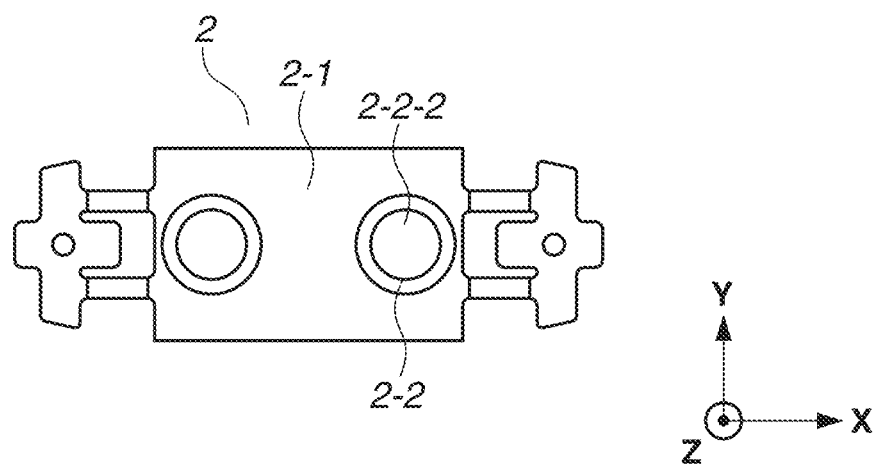
FIG. 2A is a plan view illustrating the vibration member of the vibratory actuator according to an exemplary embodiment of the present disclosure.
Figure 2B:
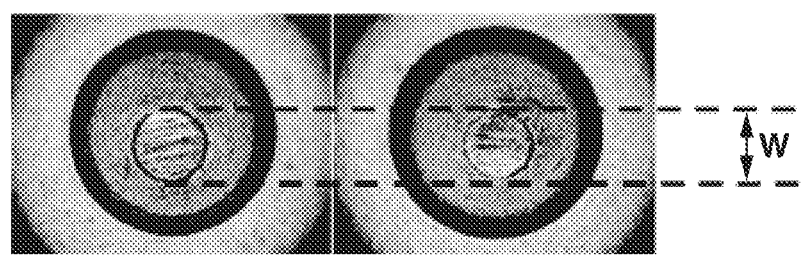
FIG. 2B is an enlarged photograph of a contact portion of an elastic member (first contact portion) after a running-in operation.
Figure 8C:
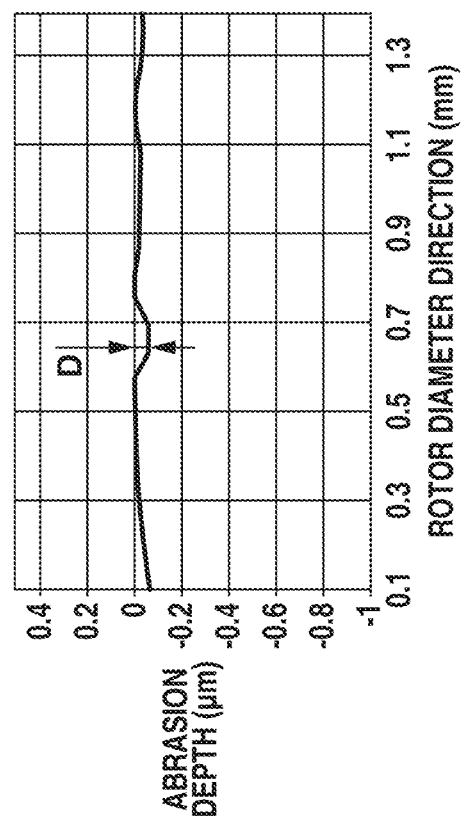
FIG. 8C illustrates a result of measurement of the contact surface by using a surface roughness meter (after removing spatial frequency components of relatively short wavelengths).
Figure 8A:
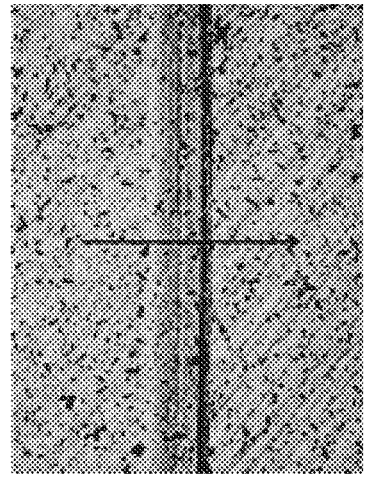
FIG. 8A is an enlarged photograph of the contact surface between the contact member (second contact surface) included in the vibratory actuator and the vibration member after the running-in operation according and the exemplary embodiment of the present disclosure.
Figure 8B:
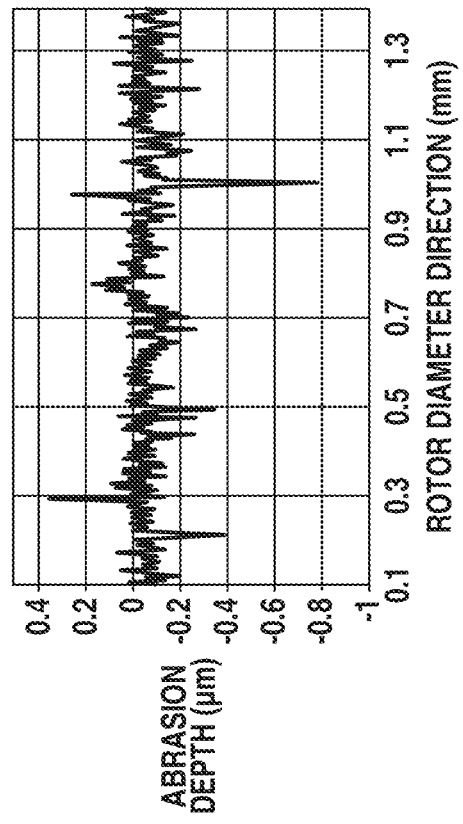
FIG. 8B illustrates a result of measurement of the contact surface by using a surface roughness meter.

In the running-in operation with the external load applied, since the temperature of the actuator increases, it is not possible to determine whether aging has progressed or the speed has changed due to the resonance frequency change, in constant-frequency drive. Thus, in the running-in operation with the external load applied, the speed stability determination unit 24 is not operated. The drive time or the number of drives (the number of reciprocating motions) in the running-in operation with the external load applied is equal to or greater than the drive time or the number of drives (the number of reciprocating motions) in the running-in operation with no external load applied. FIGS. 2A and 2B illustrate the condition of the contact portion of the vibration member 1 (first contact portion) having been subjected to the running-in operation according to the first exemplary embodiment. FIGS. 8A to 8C illustrate the condition of the contact portion of the rotor 8 (contact member) (second contact portion) having been subjected to the running-in operation according to the first exemplary embodiment. FIG. 2A is a plan view illustrating the vibration member. FIG. 2B is an enlarged photograph of the contact portion 2-2-2 of the elastic member 2 (first contact portion) having been subjected to the running-in operation, when viewed from the same direction as that in FIG. 2A.

A flat portion by sliding is formed in the contact portion 2-2-2 (within the spherical shape) having a spherical shape. On the other hand, FIG. 8A is a photograph of the contact portion on the rotor side (second contact portion) where the vibration member in FIG. 2A slid. FIG. 8B illustrates a result of measurement in the direction of the arrow in FIG. 8A by using a contact surface roughness meter. FIG. 8C illustrates a result of processing performed on the result in FIG. 8B by using a method (described below). Referring to FIGS. 8B and 8C, the horizontal axis indicates the radial position on the rotor 8 (contact member) (in mm, referred to as "Rotor Diameter Direction" in FIGS. 8B and 8C). The vertical axis indicates the height in the pressure direction (referred to as "Abrasion Depth" in FIGS. 8B and 8C).

Since the rotor 8 (contact member) is made of a porous metal sintered material, porous portions locally have deep concave portions where dust may be locally protruded. Since the size of porous portions is at most about 50 μm, performing processing to remove spatial frequencies of 20 kHz or higher (wavelengths of 50 μm or less) enables obtaining the shape of the contact portion (second contact portion) as illustrated in FIG. 8C. The maximum amount of depression (D) (described below) is obtained by measuring the shape of the contact portion.

Figure 9A:
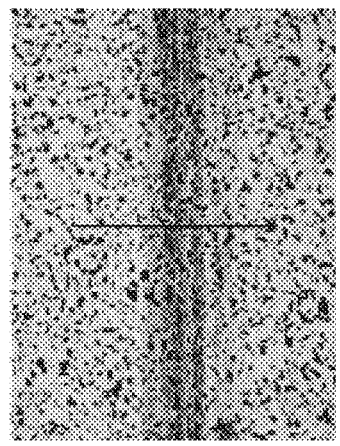
FIG. 9A is an enlarged photograph of the contact surface between the contact member (second contact surface) included in the vibratory actuator and the vibration member after the conventional running-in operation.
Figure 9C:
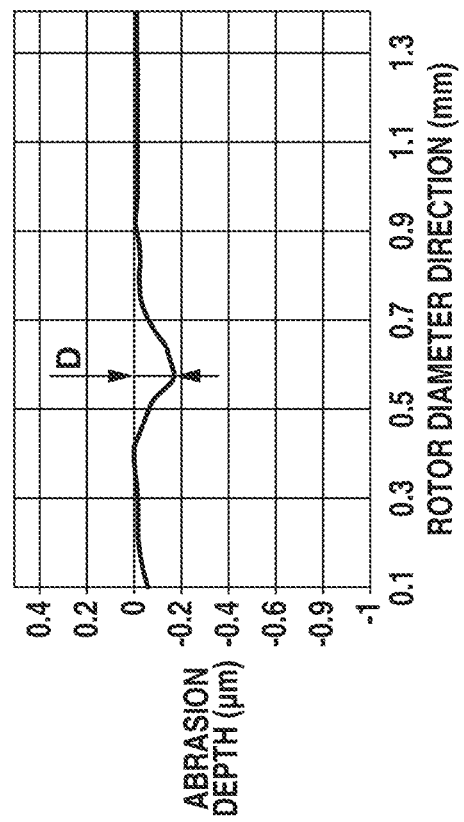
FIG. 9C illustrates a result of measurement of the contact surface by using a surface roughness meter (after removing spatial frequency components of relatively short wavelengths).
Figure 9B:
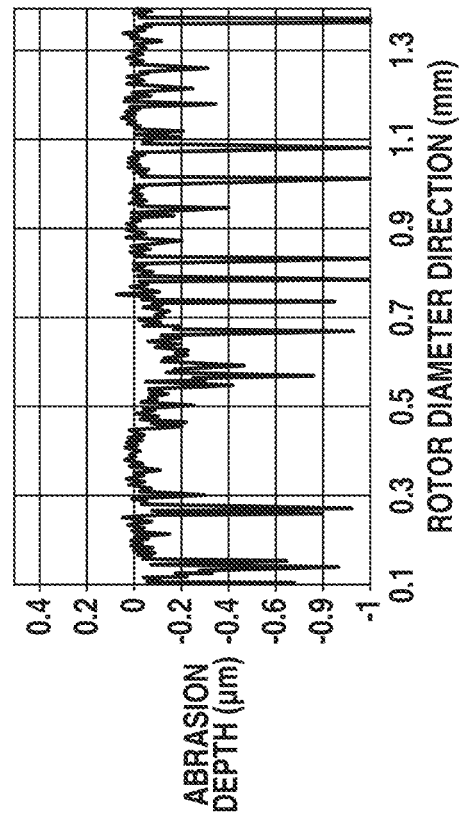
FIG. 9B illustrates a result of measurement of the contact surface by using a surface roughness meter.

For reference, FIGS. 9A to 9C illustrate an enlarged photograph and surface shapes of the contact portion when the rotor 8 (contact member) is damaged in the conventional running-in operation. The contact surface of the vibration member (first contact surface) in contact with the contact member illustrated in FIG. 2B has a size W in the Y direction perpendicular to the X and Z directions.

The contact surface of the rotor 8 (contact member) (second contact surface) illustrated in FIG. 9C has a maximum amount of depression D in the Z direction. If the ratio of the maximum amount of depression on the second contact surface in the Z direction to the width of the first contact surface in the Y direction (D/W) is equal to or less than 0.05% (upper limit), no endurance issue will occur.

For example, for the vibratory actuator in FIGS. 2A, 2B, and 8A to 8C, D=0.08 μm, W=0.23 mm, and D/W=0.035%. For the vibratory actuator in FIGS. 9A to 9C, D=0.18 μm, W=0.3 mm, and D/W=0.06%. The vibratory actuators in FIGS. 2A, 2B, and 8A to 8C revealed no performance degradation during an endurance test. On the other hand, the vibratory actuator in FIGS. 9A to 9C revealed performance degradation during the endurance test.

To conform the contact surface (second contact surface) made of a metal sintered material to the facing surface, an oxide layer formed on the surface of the metal sintered material is to be removed, at least, to enhance friction force. Therefore, the maximum amount of depression (D) needs to be equal to or greater than the film thickness of the oxide layer (several nanometers: lower limit) formed on the surface of the metal sintered material.

According to the present exemplary embodiment, the flat portion of the vibration member is φ0.23, the pressure force is 167 gf per protrusion, and the surface pressure acting on the first contact surface is 4 kilogram-force per square millimeter (kgf/mm$^2$). Since abrasion due to drive depends on the surface pressure, the surface pressure acting on the first contact surface needs to be 5 kgf/mm$^2$ or less upon completion of the running-in operation. Then, when abrasion due to drive progresses, the diameter of the flat portion of the vibration member increases to decrease the surface pressure, and abrasion no longer progresses. After the conventional running-in operation in FIGS. 9A to 9C, the surface pressure acting on the first contact surface becomes 5 kgf/mm$^2$ or less, but the rotor 8 (contact member) is damaged before the surface pressure reaches this value, causing an adverse effect on performance.

The rotor 8 (contact member), which is a metal sintered material made of martensitic stainless steel, is quenched after baking to obtain a Vickers' hardness of 550 HV (Vickers Pyramid Number) or more to improve the resistance to abrasion. Further, to reduce the frictional force degradation by leaving the rotor 8 under high temperature and high humidity, the rotor 8 (contact member) is impregnated with a resin mixed with hard particles such as silicon carbide (SiC).

A second exemplary embodiment will be described. FIG. 10A illustrates an image of stepwisely increasing the external load like in the first exemplary embodiment, but the present disclosure is not limited thereto. For example, the load may be increased linearly as illustrated in FIG. 10B or nonlinearly based on a three-dimensional curve as illustrated in FIG. 10C. In any case, the drive time or the number of drives (the number of reciprocating motions) since the external load is applied until it reaches the rated load needs to be made equal to or greater than the drive time or the number of drives (the number of reciprocating motions) without an external load.

Other Exemplary Embodiments

While the present disclosure has specifically been described based on preferred exemplary embodiments, the present disclosure is not limited to these specific exemplary embodiments. Diverse embodiments not departing from the spirit and scope of the present disclosure are also included in the present disclosure. For example, the vibratory actuator according to the present disclosure is not limited to the rotary actuator illustrated in FIG. 1. The present disclosure is also applicable to, for example, a linear actuator including one or a plurality of vibration members arranged in the drive direction or arranged to sandwich the contact member with upper and lower surfaces, and to a method for manufacturing the linear actuator.

The vibratory actuator according to the present disclosure is applicable to diverse applications including lens drive applications of imaging apparatuses (optical apparatuses), rotational drive applications of photosensitive drums of copying machines, and drive applications of stages. As an example, an imaging apparatus (optical apparatus) using a vibratory actuator that includes a plurality of vibration members annularly arranged and rotatably drives a contact member, to drive the lenses arranged in the lens barrel.

Figure 11A:
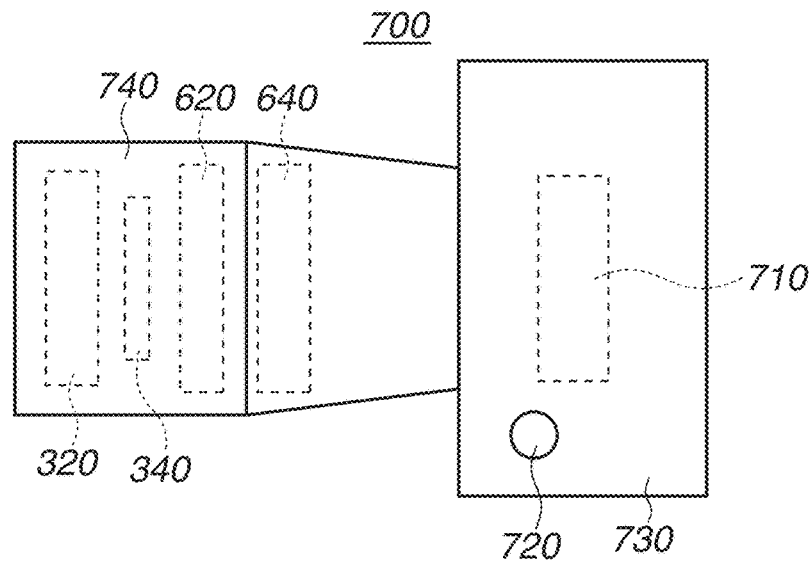
FIG. 11A is a top view illustrating an overall configuration of an imaging apparatus including the vibratory actuator according to an exemplary embodiment of the present disclosure.

FIG. 11A is a top view illustrating an overall configuration of an imaging apparatus 700. The imaging apparatus 700 includes a camera main body 730 having an image sensor 710 and a power button 720. The imaging apparatus 700 also includes a lens barrel 740 including a first lens group (not illustrated), a second lens group 320, a third lens group (not illustrated), a fourth lens group 340, and vibratory actuators 620 and 640. The lens barrel 740 is attachable to and detachable from the camera main body 730 as an interchangeable lens.

The imaging apparatus 700 drives the second lens group 320 by using the vibratory actuator 620 and drives the fourth lens group 340 by using the vibratory actuator 640. The vibratory actuators 620 and 640 use the vibration member 1 described above with reference to FIGS. 1A, 1B, 3A, and 3B. For example, the rotation of the contact member included in the vibratory actuator 620 is converted into a translatory movement in the optical axis direction by gears to adjust the position of the second lens group 320 in the optical axis direction. The vibratory actuator 640 has a similar configuration.

Figure 11B:
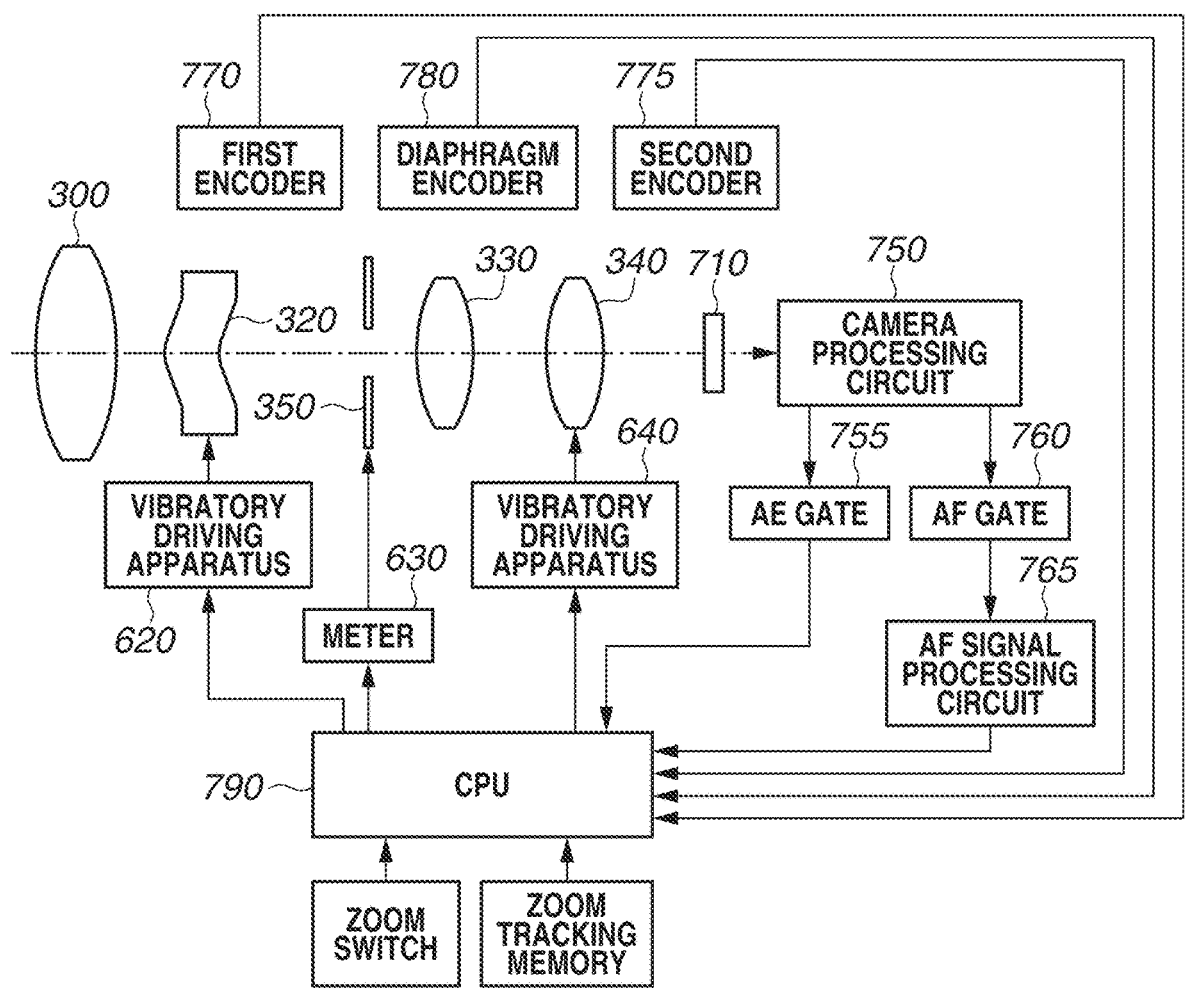
FIG. 11B is a block diagram illustrating an overall configuration of the imaging apparatus.
Figure 14A:
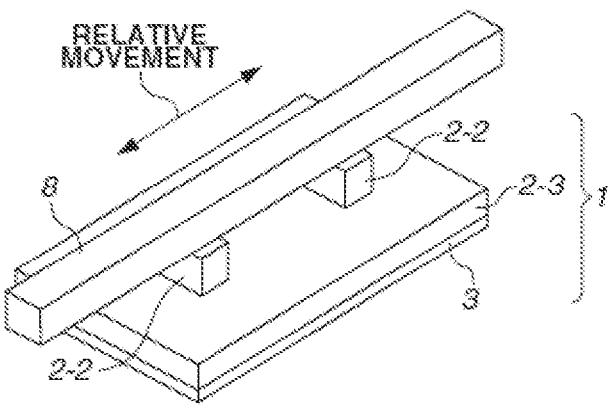
FIGS. 14A to 14D illustrate the vibration modes of the vibration member.
Figure 14B:
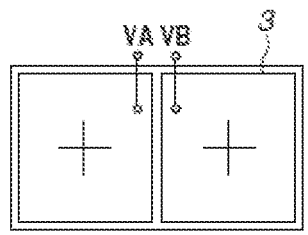
Figure 14C:
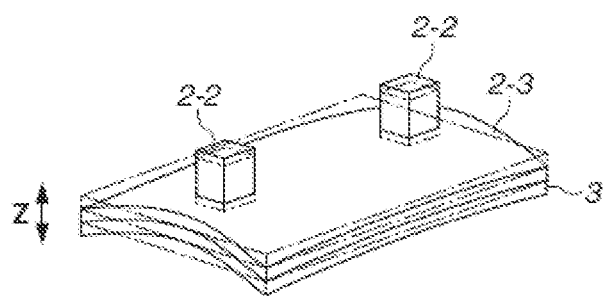
Figure 14D:
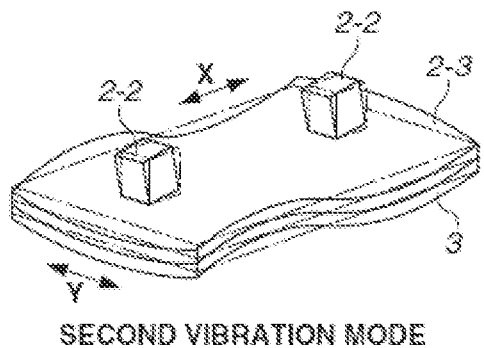

FIG. 11B is a block diagram illustrating an overall configuration of the imaging apparatus 700. A first lens group 310, the second lens group 320, a third lens group 330, the fourth lens group 340, and a light quantity adjustment unit 350 are disposed at predetermined positions on the optical axis in the lens barrel 740. Light that passed through the first lens group 310 to the fourth lens group 340 and light quantity adjustment unit 350 is focused on the image sensor 710. The image sensor 710 converts an optical image into an electrical signal and outputs the electrical signal to a camera processing circuit 750.

The camera processing circuit 750 may include one or more circuits and subjects the output signal from the image sensor 710 to amplification and gamma correction. The camera processing circuits 750 are connected to a central processing unit (CPU) 790 via an automatic exposure (AE) gate 755 and, at the same time, is connected to the CPU 790 via an automatic focusing (AF) gate 760 and an AF signal processing circuit 765. A video signal having been subjected to predetermined processing by the camera processing circuits 750 are sent to the CPU 790 via the AE gate 755, the AF gate 760, and the AF signal processing circuit 765. The AF signal processing circuit 765 extracts high-frequency components of the video signal to generate an evaluation value signal for automatic focusing (AF) and then supplies the generated evaluation value to the CPU 790.

The CPU 790, a control circuit which controls overall operations of the imaging apparatus 700, generates a control signal for exposure determination and focus adjustment based on an acquired video signal. To acquire determined exposure and a suitable focusing state, the CPU 790 controls the drive of the vibratory actuators 620 and 640 and a meter 630 to adjust the positions of the second lens group 320, the fourth lens group 340, and the light quantity adjustment unit 350 in the optical axis direction. Under the control of the CPU 790, the vibratory actuator 620 moves the second lens group 320 in the optical axis direction, and the vibratory actuator 640 moves the fourth lens group 340 in the optical axis direction, and the light quantity adjustment unit 350 is driven and controlled by the meter 630.

The position of the second lens group 320 driven by the vibratory actuator 620 in the optical axis direction is detected by the first encoder 770, and the CPU 790 is notified of a result of detection. Then, the position is fed back to the drive of the vibratory actuator 620. Likewise, the position of the fourth lens group 340 driven by the vibratory actuator 640 in the optical axis direction is detected by the second encoder 775, and the CPU 790 is notified of a result of detection. Then, the position is fed back to the drive of the vibratory actuator 640. The position of the light quantity adjustment unit 350 in the optical axis direction is detected by a diaphragm encoder 780, and the CPU 790 is notified of a result of detection. Then, the position is fed back to the drive of the meter 630.

The vibratory actuators 620 and 640 are not limited to applications for driving the lens groups in the optical axis direction in the imaging apparatus 700 but applicable to applications for driving an image shake correction lens or an image sensor in a direction orthogonal to the optical axis.

The present disclosure makes it possible to provide a vibratory actuator that prevents the contact surface of the contact member from being damaged by the vibration member, and a method for manufacturing the vibratory actuator.

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may include one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read-only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2020-183649, filed Nov. 2, 2020, which is hereby incorporated by reference herein in its entirety.

What is claimed is:

1. A vibratory actuator comprising:
   a vibration member including an elastic member and an electro-mechanical energy transducer fixed to the elastic member, wherein the elastic member has protrusions formed on the elastic member;
   a contact member in contact with the elastic member and configured to be moved in a direction relative to the vibration member by a vibration that is generated in the vibration member by an alternating-current (AC) voltage applied to the electro-mechanical energy transducer; and
   a pressure member configured to pressurize the vibration member and the contact member,
   wherein each of the protrusions includes a first contact surface in contact with the contact member,
   wherein the contact member has a second contact surface made of metal sintered material and in contact with the vibration member, and
   wherein a ratio of a maximum amount of depression on the second contact surface in a direction of pressurization by the pressure member to a width of the first contact surface in a direction perpendicular to the direction of movement of the contact member relative to the vibration member and the direction of pressurization by the pressure member is 0.05% or less.

2. The vibratory actuator according to claim 1, wherein the maximum amount of depression is equal to or greater than a film thickness of an oxide layer formed on a surface of the metal sintered material.

3. The vibratory actuator according to claim 1, wherein a surface pressure acting on the first contact surface by the pressure member is 5 kgf/mm2 or less.

4. The vibratory actuator according to claim 1,
   wherein each of the protrusions includes a first contact portion having a spherical shape, and
   wherein the first contact surface is formed within the spherical shape.

5. The vibratory actuator according to claim 1, wherein each of the protrusions includes:
   a first contact portion where the first contact surface is formed,
   a side wall that protrudes from the elastic member to form a hollow structure, and
   a connecting portion configured to connect the first contact portion and the side wall and that has flexibility in the direction of pressurization by the pressure member.

6. The vibratory actuator according to claim 1, wherein the second contact surface of the contact member is impregnated with a resin.

7. A method for manufacturing a vibratory actuator, wherein the vibratory actuator includes:
   a vibration member including an elastic member and an electro-mechanical energy transducer fixed to the elastic member, wherein the elastic member has protrusions formed on the elastic member,
   a contact member in contact with the elastic member and configured to be moved in a direction relative to the vibration member by a vibration that is generated in the vibration member by a voltage applied to the electro-mechanical energy transducer, and
   a pressure member configured to pressurize the vibration member and the contact member,
   wherein each of the protrusions has a first contact surface in contact with the contact member, and
   wherein the contact member has a second contact surface made of metal sintered material and in contact with the vibration member, the method comprising:
   providing a driven member configured to be driven when the contact member is moved relative to the vibration member; and
   driving the driven member while increasing an external load applied to the driven member so that a ratio of a maximum amount of depression on the second contact surface in a direction of pressurization by the pressure member to a width of the first contact surface in a direction perpendicular to the direction of movement of the contact member relative to the vibration member and the direction of pressurization by the pressure member is 0.05% or less.

8. The method according to claim 7, wherein the driven member is driven while stepwisely increasing the external load applied to the driven member.

9. The method according to claim 7, wherein the driven member is driven while linearly increasing the external load applied to the driven member.

10. The method according to claim 7, wherein the driven member is driven while nonlinearly increasing the external load applied to the driven member.

11. The method according to claim 7, wherein the driven member is driven while increasing the external load applied to the driven member from a state of no external load applied to the driven member.

12. The method according to claim 11, wherein the driven member is driven by an alternating-current (AC) voltage with a frequency determined in accordance with frequency versus speed characteristics in a case of no external load applied to the driven member.

13. The method according to claim 11, wherein the external load is increased from a state of no external load applied to the driven member at a timing determined in accordance with a speed up rate in a case of no external load applied to the driven member.

14. The method according to claim 13, wherein the speed up rate is measured at intervals for a predetermined drive time.

15. The method according to claim 13, wherein the speed up rate is measured at intervals of a predetermined number of reciprocating motions.

16. The method according to claim 11, wherein a drive time or a number of drives of the driven member in a case where the external load is increased from the state of no external load applied to the driven member is equal to or greater than the drive time or the number of drives of the driven member in the state of no external load applied to the driven member.

* * * * *